United States Patent [19]

Lassanske

[11] 4,367,702
[45] Jan. 11, 1983

[54] INTERNAL COMBUSTION ENGINE WITH AUTOMATIC COMPRESSION RELEASE

[75] Inventor: George G. Lassanske, Oconomowoc, Wis.

[73] Assignee: Outboard Marine Corporation, Waukegan, Ill.

[21] Appl. No.: 230,126

[22] Filed: Jan. 30, 1981

[51] Int. Cl.³ .............................................. F02F 5/00
[52] U.S. Cl. .............................. 123/182; 123/193 P; 92/162 R; 92/181 R; 277/136
[58] Field of Search ............. 123/182, 193 P, 193 CP, 123/193 R; 277/216, 136; 92/181 R, 181 P, 162 R, 162 P, 126, 127

[56] References Cited

U.S. PATENT DOCUMENTS

| | | | |
|---|---|---|---|
| 2,072,623 | 3/1937 | Illmer | 309/44 |
| 2,980,088 | 4/1961 | Hines | 277/13.6 |
| 3,667,443 | 6/1972 | Currie et al. | 123/193 P |
| 4,111,104 | 9/1978 | Davison, Jr. | 123/193 P |
| 4,154,207 | 5/1979 | Brehob | 123/193 P |

*Primary Examiner*—Charles J. Myhre
*Assistant Examiner*—Andrew M. Dolinar
*Attorney, Agent, or Firm*—Michael, Best & Friedrich

[57] ABSTRACT

An internal combustion engine is illustrated having an engine block, a cylinder located in the engine block, and a cylinder head defining an end wall of the cylinder. A piston is housed in the cylinder and defines with the cylinder and the cylinder head a combustion space adapted to receive a mixture of fuel and air therein. The piston is reciprocably movable toward the cylinder head to compress a fuel mixture in the cylinder and movable away from the cylinder head, the piston engaging one side of the cylinder as the piston moves toward the cylinder and engaging an opposite side of the cylinder as the piston moves away from the cylinder head. The piston includes an annular groove, and the piston ring is housed in the annular groove, the piston ring including opposite ends being spaced apart and forming a gap. The piston ring is positioned with the gap adjacent that side of the cylinder engaged by the piston as the piston moves away from the cylinder head such that the gap provides for pressure release from the combustion chamber during movement of the piston toward the cylinder head.

3 Claims, 5 Drawing Figures

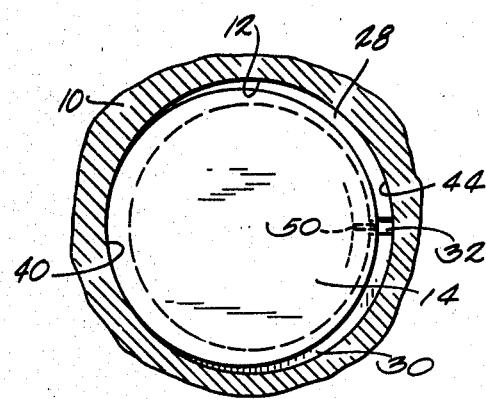
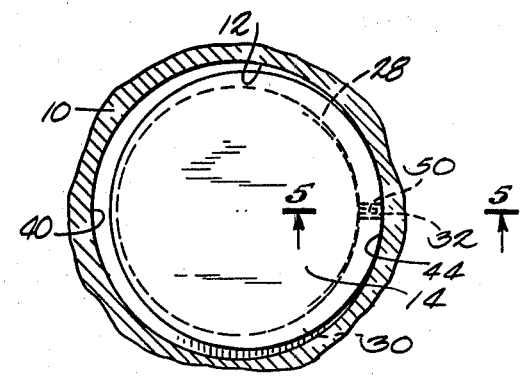
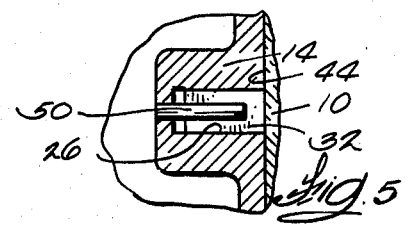
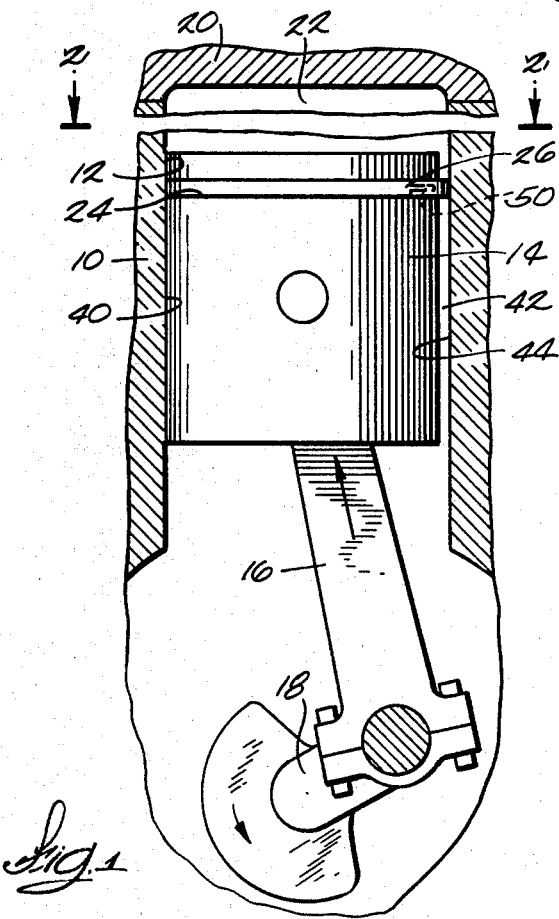
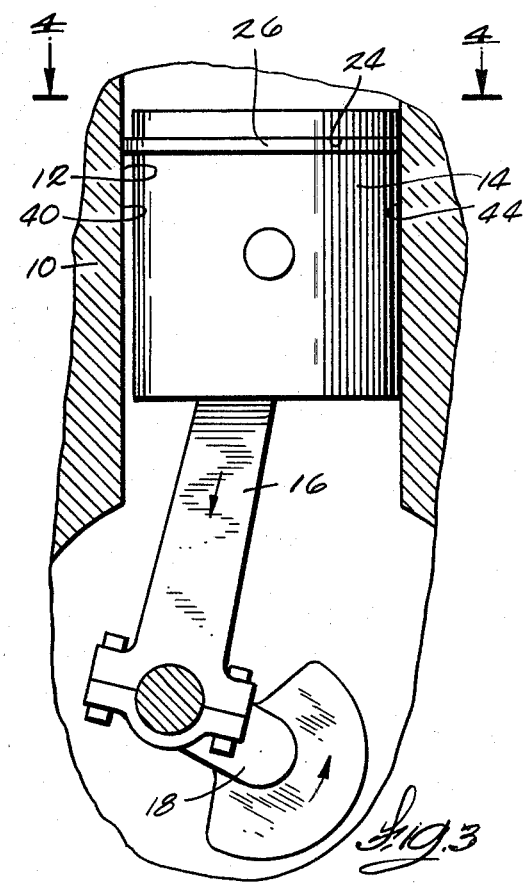

INTERNAL COMBUSTION ENGINE WITH AUTOMATIC COMPRESSION RELEASE

FIELD OF THE INVENTION

The invention relates to internal combustion engines and to the construction of an internal combustion engine in such a manner that improved starting of the engine is facilitated.

BACKGROUND PRIOR ART

In the construction of internal combustion engines, engine starting has been improved by providing means for releasing the pressure in the combustion chamber during the compression stroke. Such compression release mechanisms are intended to permit easier cranking of the engine to provide for easier starting. In the past such pressure release mechanisms have comprised mechanical pump valves which are either manually or automatically actuated during starting of the engine.

Attention is also directed to the U.S. Illmer Pat. No. 2,072,623, issued Mar. 2, 1937; the U.S. Brehob Pat. No. 4,154,207, issued May 15, 1979; and the U.S. Currie et al. Pat. No. 3,667,443, issued June 6, 1972.

SUMMARY OF THE INVENTION

The invention includes an improved means for providing a compression release in an internal combustion engine. More particularly, the invention includes an internal combustion engine including an engine block, a cylinder located in the engine block, and a cylinder head defining an end wall of the cylinder. A piston is housed in the cylinder and defines with the cylinder and the cylinder head a combustion space adapted to receive a mixture of fuel and air therein. The piston is reciprocably movable toward the cylinder head to compress a fuel mixture in the cylinder and movable away from the cylinder head, the piston engaging one side of the cylinder as the piston moves toward the cylinder head and engaging an opposite side of the cylinder as the piston moves away from the cylinder head. The piston includes an annular groove, and the piston ring is housed in the annular groove, the piston ring including opposite ends being spaced apart and forming a gap. The piston ring is positioned with the gap adjacent that side of the cylinder engaged by the piston as the piston moves away from the cylinder head and such that the gap provides for pressure release from the combustion chamber during movement of the piston toward the cylinder head.

The invention also includes a method for constructing an internal combustion engine including an engine block, a cylinder located in the engine block, a cylinder head defining an end wall of the cylinder, and a piston housed in the cylinder and defining with the cylinder and the cylinder head a combustion space adapted to receive a mixture of fuel and air therein. The piston is reciprocably movable toward the cylinder head to compress the fuel mixture in the cylinder and away from the cylinder head, the piston engaging one side of the cylinder as the piston moves toward the cylinder head and engaging an opposite side of the cylinder as the piston moves away from the cylinder head. An annular groove surrounds the piston, and a piston ring is housed in the annular groove, the piston ring including opposite ends being spaced apart and forming a gap. The method includes the step of positioning the piston ring such that the gap is adjacent that side of the cylinder engaged by the piston as the piston moves away from the cylinder head.

The invention further includes an internal combustion engine including an engine block, a cylinder located in the engine block, a cylinder head defining an end wall of the cylinder, and a piston housed in the cylinder and defining with the cylinder and the cylinder head a combustion space adapted to receive a mixture of fuel and air. The piston is reciprocably movable toward the cylinder head to compress a fuel mixture in the cylinder and away from the cylinder head, the piston engaging one side of the cylinder as the piston moves toward the cylinder head and engaging an opposite side of the cylinder as the piston moves away from the cylinder head. An annular groove surrounds the piston, and the piston ring is housed in the annular groove, the piston ring including opposite ends being spaced apart and forming a gap. Means are also provided for maintaining a piston ring in a position wherein the gap is adjacent that side of the cylinder which is engaged by the piston as the piston moves away from the cylinder head.

Various other features and advantages of the invention will be apparent from the following description, from the claims, and from the drawings.

BRIEF DESCRIPTION OF THE DRAWINGS

FIG. 1 is a schematic view of a piston and cylinder of an internal combustion engine with a piston moving through the compression stroke and with the gap between the piston and cylinder wall shown in exaggerated form.

FIG. 2 is a cross section view taken along line 2—2 in FIG. 1.

FIG. 3 is a view similar to FIG. 1 but showing the piston in a power stroke.

FIG. 4 is a cross section view taken along line 4—4 in FIG. 3.

FIG. 5 is an enlarged cross section view taken along line 5—5.

Before describing a preferred embodiment in detail, it is to be understood that the invention is not limited in its application to the details of construction and to the arrangement of the components set forth in the following description or illustrated in the drawings. The invention is capable of other embodiments and of being practiced and carried out in various ways. Also, it is to be understood that the phraseology and terminology employed herein is for the purpose of description and should not be regarded as limiting.

DESCRIPTION OF A PREFERRED EMBODIMENT

Illustrated in FIG. 1 is a portion of an internal combustion engine. The engine includes an engine block 10 having at least one cylinder 12. A piston 14 is positioned in the cylinder 12 and is connected by a piston rod 16 with a crankshaft 18. The engine also includes a cylinder head 20 closing one end of the cylinder 12. The cylinder 12, the piston 14 and the cylinder head 20 define a combustion chamber 22.

The piston 14 includes a circumferential groove 24 surrounding its upper end. The groove 24 houses a piston ring 26 which is carried by the piston 14 and expands outwardly against the walls of the cylinder 12. In the illustrated construction, and as best shown in FIG. 5, the radial depth of the groove 24 surrounding the piston 14 is greater than the radial thickness of the piston ring 26 such that the piston ring 26 can move in and out of the groove 24, and when compressed sufficiently, the piston ring can be completely housed in the groove of the piston. As is conventional, the piston ring 26 exerts a spring-like force outwardly against the side walls of the cylinder 12 such that the periphery of the piston ring maintains engagement with the cylinder 12.

The piston ring is defined by a pair of semicircular opposed legs 28 and 30 (FIGS. 2 and 4) which are integrally connected at one end and spaced apart at the other end to form a narrow gap or opening 32 therebetween, the gap or opening 32 permitting the legs 28 and 30 to be compressed toward each other and to provide the spring-like character to the piston ring 26. In the illustrated construction, the dimension of the gap 32 between the ends of the legs 28 and 30 of the piston ring is exaggerated for purposes of description.

In operation of the engine, as the crankshaft 18 rotates in a counterclockwise direction as illustrated in FIG. 1, and when the piston 14 is in a lower position and moves upwardly, the piston rod 16 pushes the piston 14 upwardly to cause compression of the gases in the combustion chamber 22. The force of the piston rod 16 on the piston 14 includes a lateral component tending to push the piston 14 against one wall of the cylinder, that wall of the cylinder commonly being referred to as the minor thrust face 40. When the piston is in this position, there exists a clearance 42 between the other side of the piston and the cylinder wall, this portion of the cylinder wall being referred to as the major thrust face 44. As the piston 14 approaches top dead center, the forces on the piston shift and the piston 14 is forced downwardly but also against the other side of the cylinder, i.e. against the major thrust face 44. The forces on the piston 14 pushing it against the major thrust face 44 continue as the piston moves downwardly and maintain the piston against the major thrust face 44.

In the illustrated construction, the piston ring is supported with the piston ring gap 32 aligned in the cylinder such that it faces the major thrust face 44 of the cylinder 12. During cranking of the engine to start the engine, as the piston 44 moves upwardly in the cylinder, the piston is pushed against the minor thrust face 40 and will be spaced from the major thrust face 44. The piston ring 26, on the other hand, will maintain its alignment with the cylinder 12, and accordingly, the piston 14 moves laterally with respect to the piston ring 26. As the piston moves away from the major thrust face 44, a small pressure relief opening (FIG. 2) is formed by the combination of the gap 32 between the legs 28 and 30 of the piston ring and the clearance 42 between piston 14 and the major thrust face 44. Accordingly, as the piston 14 moves upwardly to compress the fuel mixture in the combustion chamber 22, some of the pressure is released through the gap 32 in the piston ring 26 and into the engine crankcase, and less force is required to cause upward movement of the piston.

On the other hand, once the engine starts and there is high speed movement of the piston 14 in the cylinder 12, very little of the fuel mixture has time to move through the very small gap 32 in the piston ring and there is little loss of compression due to the existence of the gap. Furthermore, there is no appreciable loss of combustion gases through the gap 32 once the piston has reached its top dead center position and moves through its power stroke. As the piston 14 reaches top dead center, its position shifts laterally in the cylinder 12 to a position adjacent the major thrust face 44 as shown in FIGS. 3 and 4, and that portion of the piston ring 26 forming the gap 32 moves radially inwardly into the annular groove 24 in the piston. Thus, as the piston 14 approaches top dead center and then later moves through the power stroke, the opening provided by the gap 32 in the piston ring and the space 42 between the piston and the major thrust face is closed.

Means can further be provided for preventing rotation of the piston ring 26 with respect to the piston 14, this means causing the piston ring gap 32 to remain adjacent the major thrust face 44 of the cylinder 12. While various means can be provided to prevent rotation of the piston ring 26, in the illustrated construction a pin 50 extends from the piston into the gap 32 of the piston ring.

While in the illustrated construction, the piston 14 is shown as including only a single piston ring 26, in other embodiments the piston could include a plurality of circumferential grooves 24 each housing a piston ring 26. The pressure release referred to above could be provided by aligning each of those piston rings such that the gaps of those rings are each adjacent the major thrust face 44 of the cylinder.

Various features of the invention are set forth in the following claims.

I claim:

1. An internal combustion engine including an engine block, a cylinder located in said engine block, a cylinder head defining an end wall of said cylinder, a piston housed in said cylinder and defining with said cylinder and said cylinder head a combustion space adapted to receive therein a mixture of fuel and air, and said piston being reciprocably movable toward said cylinder head to compress a fuel mixture in said cylinder and away from said cylinder head, said piston engaging one side of said cylinder as said piston moves toward said cylinder head and engaging an opposite side of said cylinder as said piston moves away from said cylinder head, an annular groove in the periphery of said piston, and a piston ring housed in said annular groove, said piston ring including opposite ends being spaced apart and forming a gap, said piston ring being positioned with said gap adjacent said opposite side of said cylinder so that said gap is closed during piston movement from said head and so that said gap provides compression relief during piston movement toward said head.

2. A method for constructing an internal combustion engine including an engine block, a cylinder located in the engine block, a cylinder head defining an end wall of the cylinder, a piston housed in the cylinder and defining with the cylinder and the cylinder head a combustion space adapted to receive therein a mixture of fuel and air, the piston being reciprocably movable toward the cylinder head to compress a fuel mixture in the cylinder and away from the cylinder head, the piston engaging one side of the cylinder as the piston moves toward the cylinder head and engaging an opposite side of the cylinder as the piston moves away from the cylinder head, an annular groove in the periphery of the piston, and a piston ring housed in the annular groove, said piston ring including opposite ends being spaced apart and forming a gap, the method including the step of positioning said piston ring with said gap adjacent said opposite side of said cylinder so that said gap is closed during piston movement from the head and so that said gap provides compression relief during at least a portion of said movement of said piston toward the cylinder head.

3. An internal combustion engine including an engine block, a cylinder located in said engine block, a cylinder head defining an end wall of said cylinder, a piston housed in said cylinder and defining with said cylinder and said cylinder head a combustion space adapted to receive therein a mixture of fuel and air, and said piston being reciprocably movable toward said cylinder head to compress a fuel mixture in said cylinder and away from said cylinder head, said piston engaging one side of said cylinder as said piston moves toward said cylinder head and engaging an opposite side of said cylinder as said piston moves away from said cylinder head, an annular groove in the periphery of said piston, a piston ring housed in said annular groove, said piston ring including opposite ends being spaced apart and forming a gap, and means for maintaining said piston ring in a position wherein said gap is adjacent said opposite side of said cylinder so that said gap is closed during piston movement from said head and so that said gap provides compression relief during piston movement toward said head.

* * * * *